(12) United States Patent
Fan et al.

(10) Patent No.: US 8,348,444 B2
(45) Date of Patent: Jan. 8, 2013

(54) BACKLIGHT MODULE

(75) Inventors: Kuang-Yu Fan, Taipei County (TW); Cheng-Chuan Chen, Hsinchu County (TW); Tsung-Hsien Lin, Taichung County (TW); Shih-Jun Yuan, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 249 days.

(21) Appl. No.: 12/793,692

(22) Filed: Jun. 4, 2010

(65) Prior Publication Data

US 2011/0216527 A1  Sep. 8, 2011

(30) Foreign Application Priority Data

Mar. 4, 2010 (TW) ................................ 99106292 A

(51) Int. Cl.
G09F 13/04 (2006.01)
(52) U.S. Cl. ...................................... 362/97.1; 362/97.4
(58) Field of Classification Search ......... 362/97.1–97.4
See application file for complete search history.

(56) References Cited

U.S. PATENT DOCUMENTS

| 7,192,149 B2* | 3/2007 | Lai ................................... 362/29 |
| 8,115,889 B2* | 2/2012 | Kim ................................. 349/64 |
| 2005/0162868 A1* | 7/2005 | Kim ............................... 362/632 |
| 2006/0291190 A1 | 12/2006 | Tsai |
| 2009/0097231 A1* | 4/2009 | Hsiao ............................. 362/97.2 |
| 2010/0097787 A1* | 4/2010 | Azuma et al. .................. 362/97.2 |
| 2010/0208161 A1* | 8/2010 | Sasaki et al. ..................... 349/58 |

FOREIGN PATENT DOCUMENTS

| CN | 100359383 | 1/2008 |
| CN | 101149524 | 3/2008 |
| CN | 101324324 | 12/2008 |
| CN | 101713523 | 5/2010 |
| TW | M334351 | 6/2008 |
| TW | M339698 | 9/2008 |
| TW | 200925707 | 6/2009 |
| TW | 200937074 | 9/2009 |

OTHER PUBLICATIONS

"First Office Action of China Counterpart Application", issued on Nov. 22, 2010, p. 1-p. 4.

* cited by examiner

Primary Examiner — Evan Dzierzynski
(74) Attorney, Agent, or Firm — Jianq Chyun IP Office

(57) ABSTRACT

A backlight module includes a back plate, a plurality of lamps, a lamp fixing base, and a diffusion plate. The back plate has a cavity. The lamps are disposed on or above the back plate. The lamp fixing base is disposed on the back plate for fixing the lamps. The lamp fixing base has a supporting portion extending along a direction away from the back plate. An orthogonal projection of the supporting portion on the back plate is within a boundary of the cavity. The diffusion plate is disposed above or over the back plate, and the supporting portion is suitable for supporting the diffusion plate.

18 Claims, 9 Drawing Sheets

BACKLIGHT MODULE

CROSS-REFERENCE TO RELATED APPLICATION

This application claims the priority benefit of Taiwan application serial no. 99106292, filed on Mar. 4, 2010. The entirety the above-mentioned patent application is hereby incorporated by reference herein and made a part of specification.

BACKGROUND OF THE INVENTION

1. Field of the Invention

The invention relates to a backlight module. More particularly, the invention relates to a direct type backlight module.

2. Description of Related Art

In recent years, a liquid crystal display (LCD) gradually replacing a cathode ray tube (CRT) display tends to be a mainstream display product in the market. An LCD panel of the LCD is not equipped with a function of light emission, and therefore a backlight module is required for supplying a planar light source to the LCD panel and for further displaying images.

The backlight module can be categorized into a direct type backlight module and a side-emitting type backlight module. Generally, the direct type backlight module includes a back plate, a plurality of lamps, and a lamp fixing base. The lamps are arranged on the back plate to provide a light source, and the lamp fixing base is assembled to the back plate for holding the lamps. Besides, the backlight module further includes a diffusion plate for diffusing light. The lamp fixing base can have a supporting pillar for supporting the diffusion plate disposed above or over the back plate. When the backlight module withstands an external force and encounters vibration or shock, the diffusion plate bears an extremely large instant impact force exerted by the supporting pillar, and the diffusion plate is likely to be collided by the supporting pillar of the lamp fixing base, thus resulting in damages to the diffusion plate.

SUMMARY OF THE INVENTION

The invention is directed to a backlight module which can reduce an instant impact force exerted on a diffusion plate.

The invention is directed to a backlight module in which a diffusion plate is less likely to be damaged by collision of a supporting pillar.

In the invention, a backlight module including a back plate, a plurality of lamps, a lamp fixing base, and a diffusion plate is provided. The back plate has a cavity. The lamps are disposed on or above the back plate. The lamp fixing base is disposed on the back plate for fixing the lamps. The lamp fixing base has a supporting portion extending along a direction away from the back plate. An orthogonal projection of the supporting portion on the back plate is within a boundary of the cavity. The diffusion plate is disposed above or over the back plate, and the supporting portion supports the diffusion plate.

According to an embodiment of the invention, the lamp fixing base further includes two supporting arms and a plurality of lamp holders respectively located on the two supporting arms. The two supporting arms extend from two opposite sides of the supporting portion, and the lamp holders are respectively fixed onto the back plate and hang the supporting portion above the cavity through the two supporting arms.

According to an embodiment of the invention, a width of each of the two supporting arms is smaller than a width of the cavity.

According to an embodiment of the invention, the supporting portion includes a first base and a supporting pillar located on the first base, and the first base is connected to the two supporting arms.

According to an embodiment of the invention, a width of the first base and a width of a bottom of the supporting pillar are both smaller than a width of the cavity.

According to an embodiment of the invention, a total length of the first base and the two supporting arms is greater than a length of the cavity.

According to an embodiment of the invention, a length of a bottom of the supporting pillar is smaller than a length of the cavity.

According to an embodiment of the invention, one of the lamp holders includes a second base, a chuck located on the second base, and a positioning portion disposed opposite to the chuck. The chuck holds one of the lamps. The back plate further has a plurality of positioning holes, and the positioning portion is lodged in one of the positioning holes.

According to an embodiment of the invention, the backlight module further includes a reflective film disposed on the back plate. The reflective film has a plurality of slits or an opening corresponding to the cavity.

According to an embodiment of the invention, a material of the lamp fixing base includes a plastic material. Specifically, the plastic material includes polycarbonate (PC), polymethylmethacrylate (PMMA), methyl methacrylate-styrene monomer (MS), polystyrene (PS), and plastic steel (e.g., polyformaldehyde, POM).

Based on the above, the back plate of the invention has the cavity corresponding to the supporting portion of the lamp fixing base. Thereby, when the backlight module withstands an external force and encounters vibration or shock, the cavity allows flexible deformation of the supporting portion of the lamp fixing base by absorbing the force exerted on the diffusion plate by the supporting portion. As such, the diffusion plate is less likely to be damaged by collision of the supporting portion, and the instant impact force exerted on the diffusion plate is reduced.

It is to be understood that both the foregoing general descriptions and the following detailed embodiments are exemplary and are, together with the accompanying drawings, intended to provide further explanation of technical features and advantages of the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
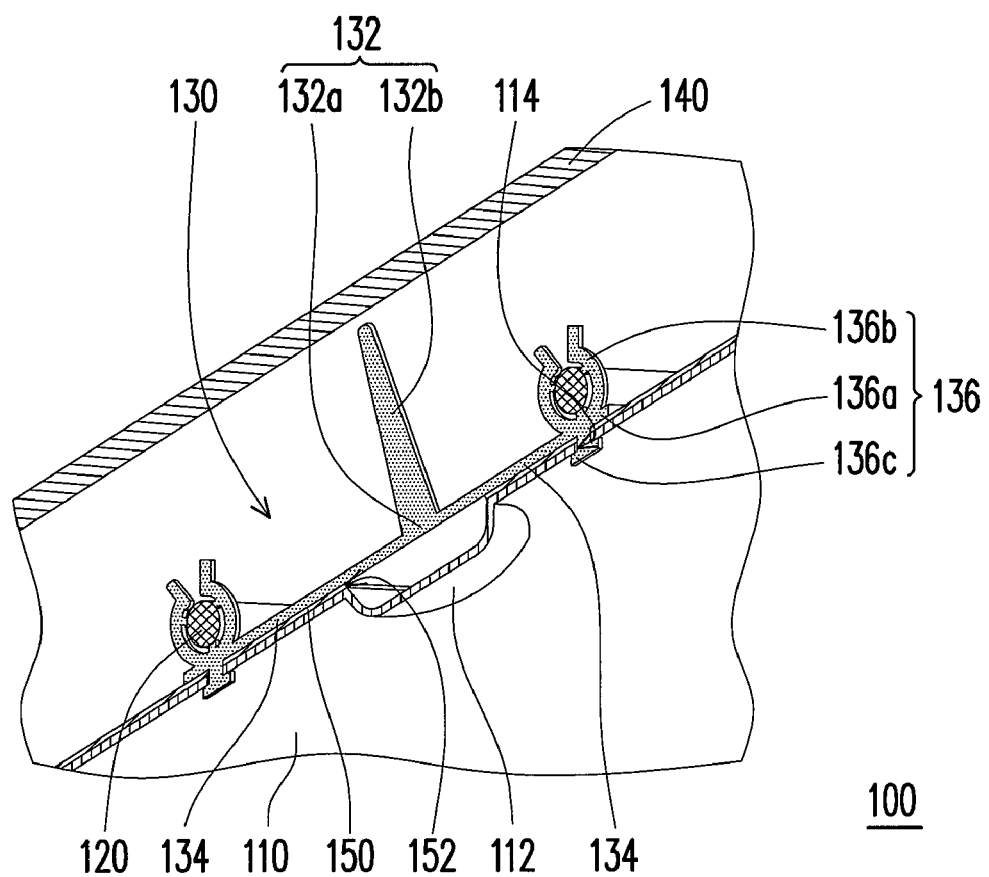
FIG. 1 is a three-dimensional cross-sectional view illustrating a backlight module according to an embodiment of the invention.
Figure 2:
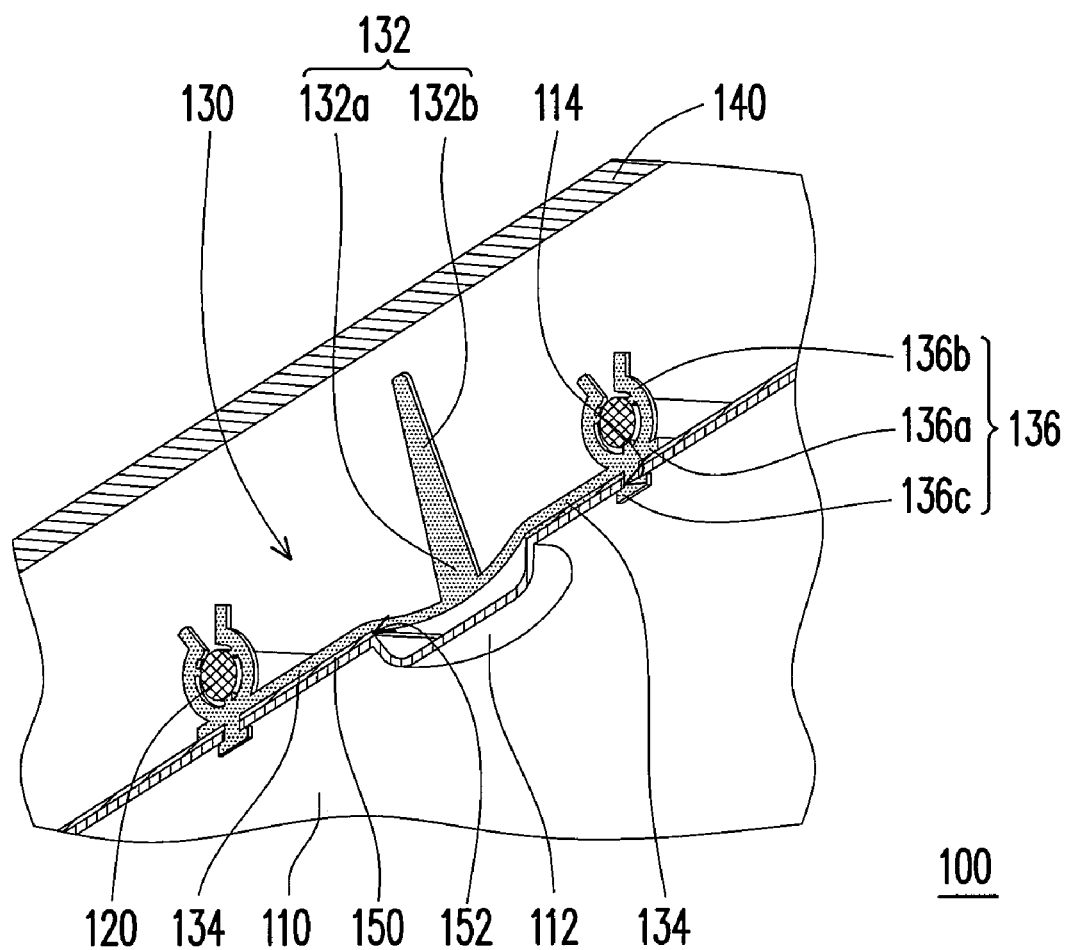
FIG. 2 is a three-dimensional cross-sectional view illustrating flexible deformation of a supporting portion in FIG. 1.

FIG. 1 is a three-dimensional cross-sectional view illustrating a backlight module according to an embodiment of the invention. FIG. 2 is a three-dimensional cross-sectional view illustrating flexible deformation of a supporting portion in FIG. 1. As shown in FIG. 1, a backlight module 100 of this embodiment includes a back plate 110, a plurality of lamps 120 (two lamps 120 are shown in FIG. 1), a lamp fixing base 130, and a diffusion plate 140. The back plate 110 has a cavity 112. The lamps 120 are disposed on or above the back plate 110 and partially captured within the lamp fixing base 130, and the lamp fixing base 130 for fixing the lamps 120 is disposed on the back plate 110 as well. The diffusion plate 140 is disposed above or over the back plate 110, the lamps 120, and the lamp fixing base 130.

The lamp fixing base 130 has a supporting portion 132 extending along a direction away from the back plate 110. The supporting portion 132 is used to support or shore up the diffusion plate 140. An orthogonal projection of the supporting portion 132 on the back plate 110 is within a boundary of the cavity 112, or the orthogonal projection of the supporting portion 132 corresponds to the cavity 112. The cavity 112 allows flexible deformation of the supporting portion 132 within the cavity 112. Thereby, when the backlight module 100 withstands an external force and encounters vibration or shock, flexible deformation of the supporting portion 132 occurs at the cavity 112 (as shown in FIG. 2), and the cavity 112 allows flexible deformation of the supporting portion 132 caused by the external force exerted on the supporting portion 132. Therefore, the external force is partially or mostly absorbed by the flexibly deformed supporting portion 132. As such, the diffusion plate 140 supported by the supporting portion 132 is less likely to be damaged by collision of the supporting portion 132 caused by the remaining force. Besides, the instant impact force exerted on the diffusion plate 140 is reduced. On the other hand, the cavity 112 is not a destructive design which may generate holes or openings on the back plate 110. Accordingly, the strength of the back plate 110 remains unaltered or decreases restrictedly. A material of the back plate 110 can be SECC (steel electrically chromate coated) or an aluminum alloy plate (e.g. AL 5052)

Specifically, the lamp fixing base 130 further includes two supporting arms 134 and a plurality of lamp holders 136 respectively located on the two supporting arms 134. The two supporting arms 134 extend from two opposite sides of the supporting portion 132. The lamp holders 136 are respectively fixed onto the back plate 110 and hang the supporting portion 132 above the cavity 112 through the two supporting arms 134. According to this embodiment, a material of the lamp fixing base 130 is, for example, a plastic material. Particularly, the plastic material includes polycarbonate (PC), polymethylmethacrylate (PMMA), methyl methacrylate-styrene monomer (MS), polystyrene (PS), and plastic steel, which should not be construed as a limitation to this invention. Here, the plastic steel specifically refers to a pliable but strong plastic material, e.g. polyformaldehyde (POM). The lamp fixing base 130 in other embodiments can also be made of other proper materials.

Figure 3:
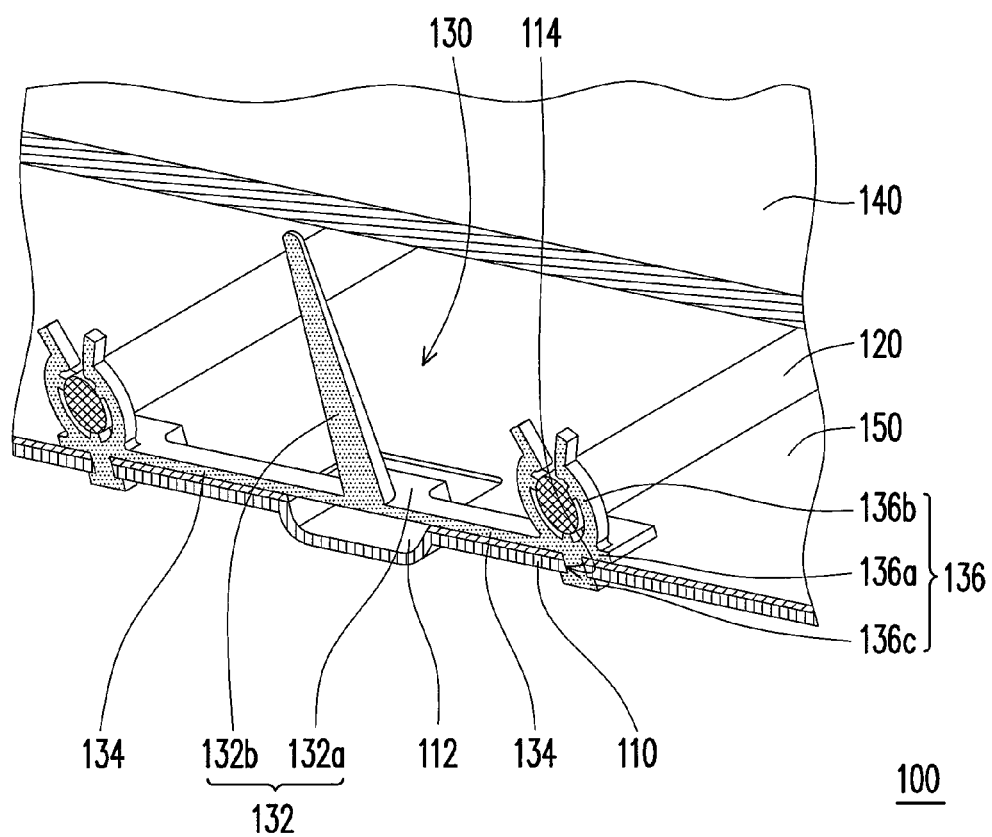
FIG. 3 is a three-dimensional cross-sectional view illustrating the backlight module depicted in FIG. 1 at another viewing angle.

FIG. 3 is a three-dimensional cross-sectional view illustrating the backlight module depicted in FIG. 1 at another viewing angle. As indicated in FIG. 3, the supporting portion 132 includes a first base 132a and a supporting pillar 132b located on the first base 132a. The first base 132a is connected to the two supporting arms 134. The supporting pillar 132b extends from the first base 132a to a direction away from the back plate 110, and the supporting pillar 132b is used to hold or support the diffusion plate 140. Besides, each of the lamp holders 136 includes a second base 136a, a chuck 136b located on the second base 136a, and a positioning portion 136c disposed opposite to the chuck 136b. The chuck 136b is used to hold or contain the lamps 120. The back plate 110 further has a plurality of positioning holes 114. The positioning portion 136c is lodged in one of the positioning holes 114, such that the lamp fixing base 130 is fixed onto the back plate 110.

In FIG. 1, the backlight module 100 of this embodiment may further include a reflective film 150. The reflective film 150 is disposed between the back plate 110 and the lamp fixing base 130 to reflect the light emitted by the lamps 120. The reflective film 150 has an opening 152 (as shown in FIG. 1 and FIG. 2) corresponding to the cavity 112, such that flexible deformation of the supporting portion 132 can occur at the cavity 112. In this embodiment, the opening 152 has a rectangular shape, and the opening 152 can also have a circular or an elliptical shape, which is not limited in this invention. On the other hand, in order to enable flexible deformation of the supporting portion 132 or allow the supporting portion 132 to shrink at the cavity 112 when the supporting portion 132 withstands an external force and encounters vibration or shock, the dimension of the opening 152 can be greater than a dimension of the bottom of the supporting pillar 132b and even greater than the dimension of the first base 132a, which is not limited in the invention.

Figure 4:
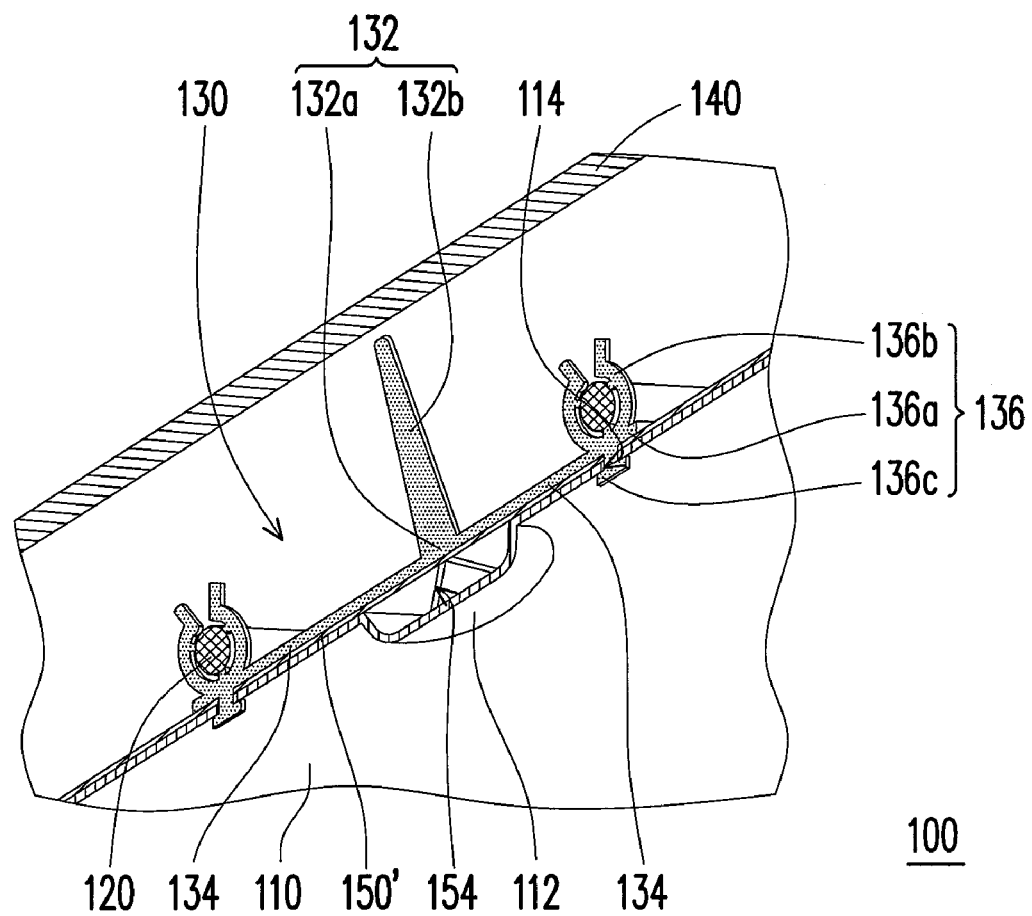
FIG. 4 is a three-dimensional cross-sectional view illustrating a backlight module according to another embodiment of the invention.

Besides, in the embodiment depicted in FIG. 4, the reflective film 150' has a plurality of slits 154 for improving flexibility of the reflective film 150'. As such, flexible deformation of the supporting portion 132 is not prevented by the reflective film 150'.

Figure 5A:
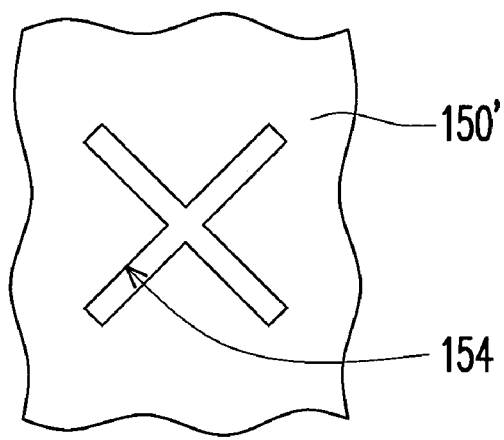
FIG. 5A is a top view illustrating the reflective film depicted in FIG. 4.
Figure 5B:
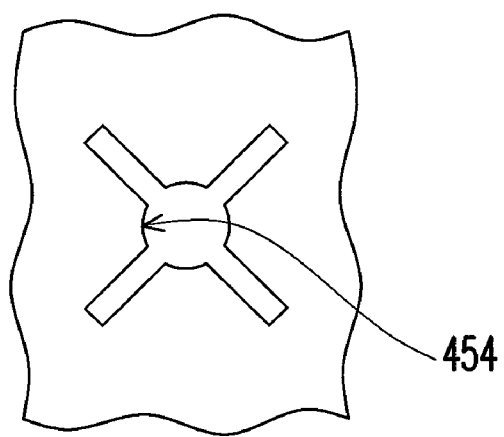
FIG. 5B is a top view illustrating a reflective film according to another embodiments of the invention.

FIG. 5A is a top view illustrating the reflective film depicted in FIG. 4. FIG. 5B is a top view illustrating a reflective film according to other embodiment of the invention. The shape of the slits in the reflective film is not limited in this invention. Namely, the slits not only can have the shape of the slits 154 as shown in FIG. 5A (i.e. the slits 154 are gathered at a region corresponding to the supporting portion 132, so as to allow the flexible deformation of the supporting portion 132 at the cavity 112) but also can have the shape of the slits 454 as shown in FIG. 5B or any other appropriate shape (i.e. the slits 454 are gathered at an opening corresponding to the supporting portion 132, so as to allow the flexible deformation of the supporting portion 132 at the cavity 112). In this embodiment as shown in FIG. 5A and FIG. 5B, the slits can have a cross shape or a shape of the letter "X", while the number of the slits in other embodiments can be greater than two, which is not limited in this invention.

In the embodiment depicted in FIG. 5A, the slits 154 preferably have a radial shape, which should not be construed as a limitation to the invention. The center of the radial slits 154 corresponds to the supporting portion 132 and the cavity 112. The small slits 154 can cover the back plate 110 to a better extent (particularly cover the cavity 112). Hence, light leakage around the supporting portion 132 of the backlight module 100 can be further reduced.

In the embodiment depicted in FIG. 5B, both the opening and the slits are formed. The slits 454 have the radial shape, and the center of the radial slits 454 has an opening corresponding to the supporting portion 132 and the cavity 112. The smaller or narrower slits 454 can cover the back plate 110 to a better extent, so as to reduce light leakage. On the other hand, the opening 254 enables more flexible deformation of the supporting portion 132 or allows the supporting portion 132 to shrink at the cavity 112 when the supporting portion 132 withstands an external force and encounters vibration or shock. In this embodiment, the slits 454 result in reasonable flexibility of the reflective film, and therefore the dimension of the opening 254 can be smaller than or equal to the dimension of the bottom of the supporting pillar 132b or the dimension of the first base 132a, which should not be construed as a limitation to this invention.

Figure 6:
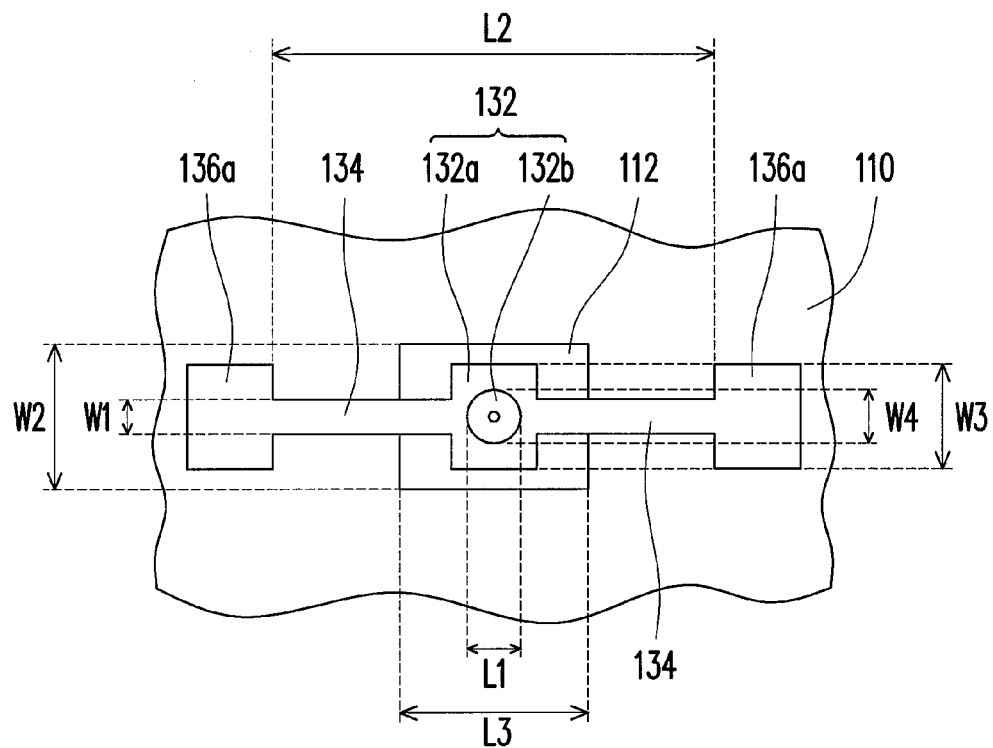
FIG. 6 is a schematic top view illustrating the lamp fixing base and the back plate depicted in FIG. 1.

FIG. 6 is a schematic top view illustrating the lamp fixing base and the back plate depicted in FIG. 1. To better illustrate the invention, the chuck 136b, the positioning portion 136c, the diffusion plate 140, and the reflective film 150 depicted in FIG. 1 are not shown in FIG. 6. With reference to FIG. 6, in this embodiment, a width W1 of each of the two supporting arms 134 is smaller than a width W2 of the cavity 112, and/or a width W3 of the first base 132a, a width W4 of a bottom of the supporting pillar 132b, and a length L1 of the bottom of the supporting pillar 132b are smaller than the width W2 of the cavity 112. Accordingly, the supporting portion 132 located at the cavity 112 and a portion of the supporting arms 134 connected to the supporting portion 132 are adapted to flexible deformation. In addition, a total length L2 of the two supporting arms 134 and the first base 132a is greater than a length L3 of the cavity 112, such that the supporting portion 132 is suitable for being hung above the cavity 112 by the two supporting arms 134. Here, the defined length is parallel to an extending direction of the two supporting arms 134 or parallel to an extending direction of one of the supporting arms 134, and the defined width is perpendicular to the extending direction of one of the two supporting arms 134. In this embodiment, the supporting pillar 132b is a cone column, and therefore the width W4 of the bottom of the supporting pillar 132b and the length L1 both refer to the diameter of the circular bottom of the cone column, which should not be construed as a limitation to this invention. On the other hand, the first base 132a, the second base 136a, and/or the two supporting arms 134 can have a rectangular shape, a strip shape, or any other shape.

Figure 7:
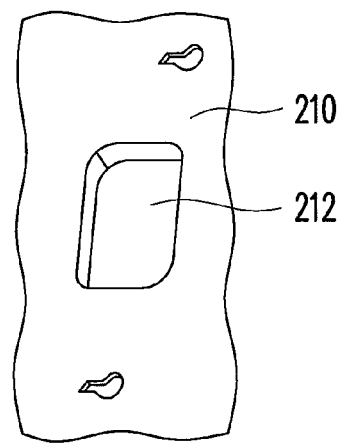
FIG. 7 is a partial three-dimensional view illustrating the back plate depicted in FIG. 4.
Figure 8:
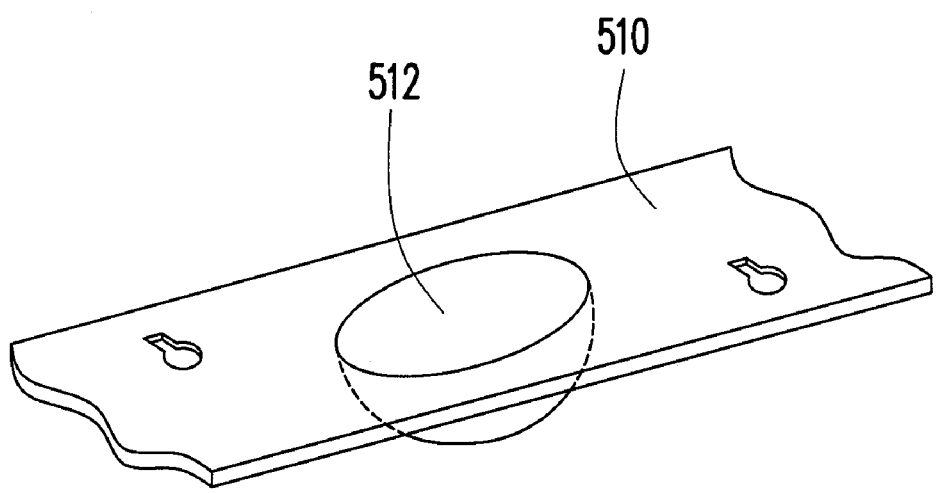
FIG. 8 is a partial three-dimensional view illustrating a back plate according to another embodiment of the invention.

FIG. 7 is a partial three-dimensional view illustrating the back plate depicted in FIG. 4. FIG. 8 is a partial three-dimensional view illustrating a back plate according to another embodiment of the invention. In FIG. 8, the cavity 512 of the back plate 510 is a circular cavity or an elliptical cavity, and the bottom of the cavity 512 can have various slopes. By contrast, the cavity 212 in FIG. 7 is a rectangular cavity or a rounded rectangular cavity, and the cavity 212 can have a flat bottom. The cavity formed on the back plate can have any other appropriate shape in other embodiments that are not depicted in the drawings, and the bottom of the cavity can also have other shapes, which should not be construed as a limitation to this invention. The width W2 and the length L3 of the cavity 512 both refer to the diameter of the circular cavity 512 according to this embodiment. However, according to another embodiment, given that the cavity 512 has the elliptical shape, the width W2 of the cavity 512 can refer to the corresponding oval axis (major axis or minor axis), which is not limited in this invention. In this embodiment, the positioning holes 114 have a gourd shape. Wide portions of the positioning holes 114 can be inserted by the positioning portions 136c of the lamp holders 136, and narrow portions of the positioning holes 114 can be lodged by the positioning portions 136c for alignment or fixed position. A channel is located between the wide and the narrow portions, such that the positioning portions 136c can move back and forth through the channel, which is conducive to assembling and disassembling the lamp holders 136.

Figure 9:
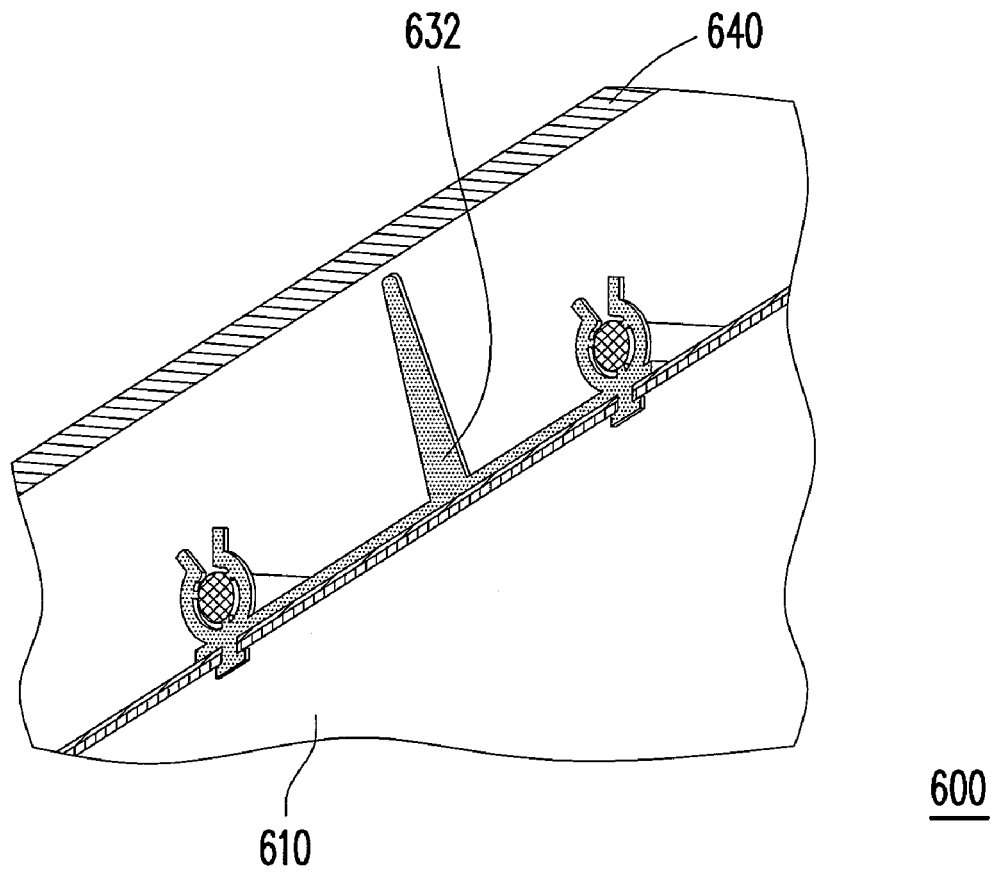
FIG. 9 is a three-dimensional view of a conventional backlight module.
Figure 10A:
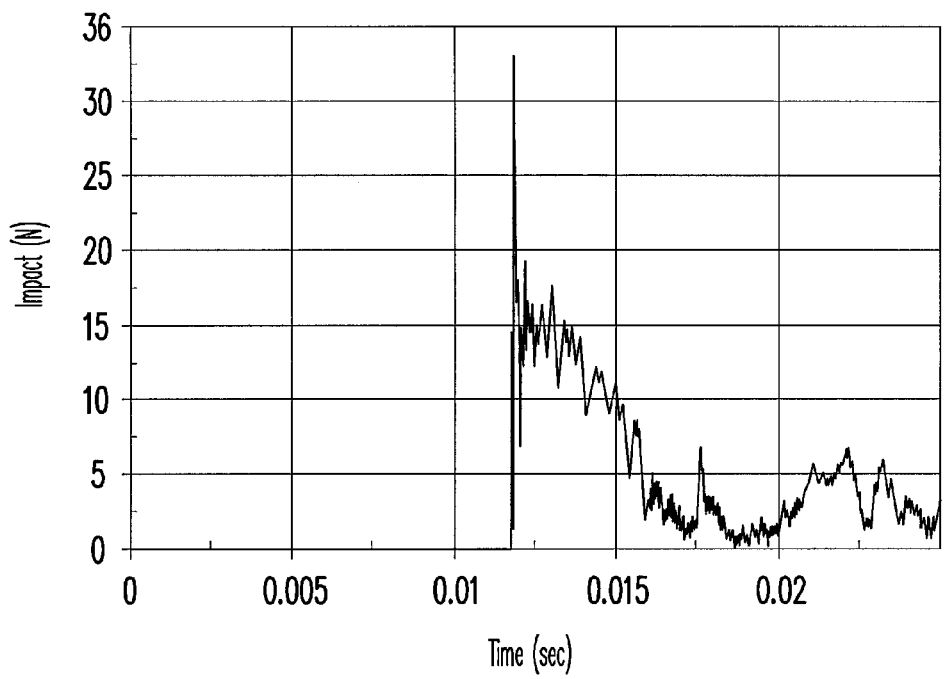
FIG. 10A illustrates a time-varying impact on a diffusion plate when an external force is applied to the backlight module depicted in FIG. 9.
Figure 10B:
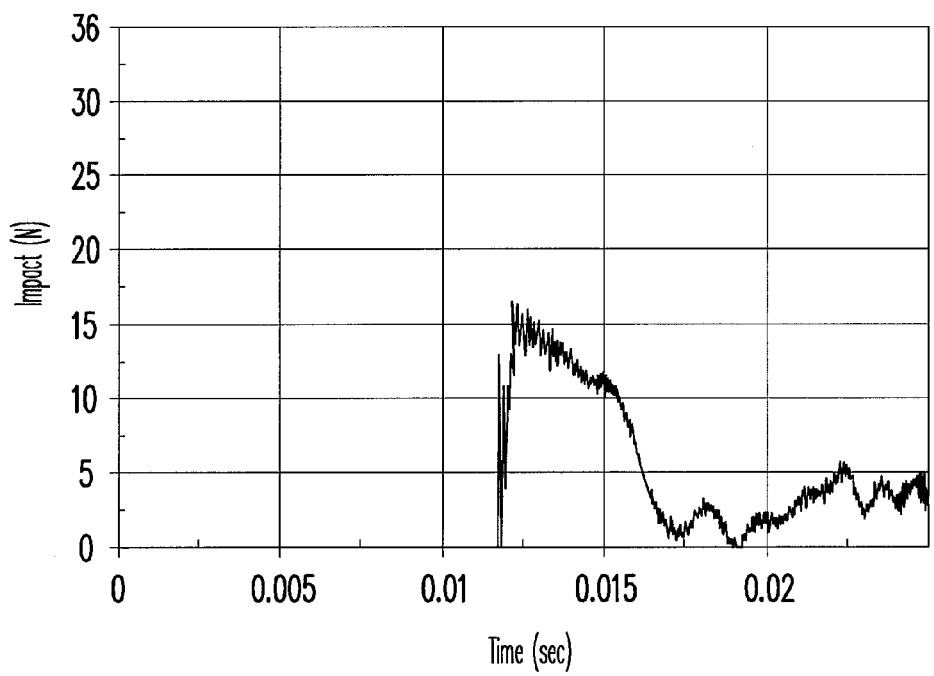
FIG. 10B illustrates a time-varying impact on a diffusion plate when an external force is applied to the backlight module depicted in FIG. 1.

FIG. 9 is a three-dimensional view of a conventional backlight module. FIG. 10A illustrates a time-varying impact on a diffusion plate when an external force is applied to the backlight module depicted in FIG. 9. FIG. 10B illustrates a time-varying impact on a diffusion plate when an external force is applied to the backlight module depicted in FIG. 1. In FIG. 10A and FIG. 10B, the horizontal axis stands for time (unit: second) and the vertical axis stands for the impact force on the diffusion plate (unit: newton). The external force applied to the backlight module is 10 G/5 ms, for example, wherein G is Newton gravitational constant, i.e. $6.67300 \times 10^{-11}$ m$^3$ kg$^{-1}$ s$^{-2}$. In FIG. 9, a back plate 610 does not have a cavity corresponding to a supporting portion 632. By contrast, when an external force is applied to the backlight module 100 depicted in FIG. 1, the cavity 112 corresponding to the supporting portion 132 allows flexible deformation of the supporting portion 132 of the lamp fixing base 130 by absorbing the force exerted on the diffusion plate 140 by the supporting portion 132. Hence, when FIG. 10A and FIG. 10B are compared, it can be learned that the maximum instant impact force on the diffusion plate 140 (shown in FIG. 10B) is apparently less than the maximum instant impact force on the diffusion plate 640 (shown in FIG. 10A) as the same external force 10 G/5 ms is applied to the backlight module 100 of this embodiment and the conventional backlight module 600 at the time 0.012 S. In the subsequent comparison of the impact force, the diffusion plate 140 of this embodiment bears a relatively small impact force, and the deformation of the diffusion plate 140 can be mitigated. Namely, the diffusion plate 140 is less likely to be damaged.

In light of the foregoing, the back plate of the invention has the cavity corresponding to the supporting portion of the lamp fixing base. Thereby, when the backlight module withstands an external force and encounters vibration or shock, the cavity allows flexible deformation of the supporting portion of the lamp fixing base by absorbing the force exerted on the diffusion plate by the supporting portion. As such, the diffusion plate is less likely to be damaged by collision of the supporting portion, and the instant impact force exerted on the diffusion plate can be reduced. Moreover, the reflective film disposed between the back plate and the lamp fixing base can have the slits or the opening corresponding to the cavity, such that the supporting portion of the lamp fixing base can successfully have flexible deformation at the cavity.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A backlight module comprising:
   a back plate having a cavity;
   a plurality of lamps disposed above the back plate;
   a lamp fixing base disposed on the back plate for fixing the lamps, the lamp fixing base having a supporting portion extending along a direction away from the back plate, an orthogonal projection of the supporting portion on the back plate being within a boundary of the cavity; and
   a diffusion plate disposed over the back plate, the supporting portion being suitable for supporting the diffusion plate.

2. The backlight module as claimed in claim 1, wherein the lamp fixing base further comprising two supporting arms and a plurality of lamp holders respectively located on the two supporting arms, the two supporting arms extend from two opposite sides of the supporting portion, and the lamp holders are respectively fixed onto the back plate and hang the supporting portion above the cavity through the two supporting arms.

3. The backlight module as claimed in claim 2, wherein a width of each of the two supporting arms is smaller than a width of the cavity.

4. The backlight module as claimed in claim 2, wherein the supporting portion comprises a first base and a supporting pillar located on the first base, and the first base is connected to the two supporting arms.

5. The backlight module as claimed in claim 4, wherein a width of the first base and a width of a bottom of the supporting pillar are both smaller than a width of the cavity.

6. The backlight module as claimed in claim 4, wherein a total length of the first base and the two supporting arms is greater than a length of the cavity.

7. The backlight module as claimed in claim 4, wherein a length of a bottom of the supporting pillar is smaller than a length of the cavity.

8. The backlight module as claimed in claim 2, wherein one of the lamp holders comprising a second base, a chuck located on the second base, and a positioning portion disposed opposite to the chuck, the chuck holds one of the lamps, the back plate further has a plurality of positioning holes, and the positioning portion is lodged in one of the positioning holes.

9. The backlight module as claimed in claim 1, further comprising a reflective film disposed on the back plate, the reflective film having a plurality of slits or an opening corresponding to the cavity.

10. The backlight module as claimed in claim 1, wherein a material of the lamp fixing base comprises a plastic material including polycarbonate, polymethylmethacrylate, methyl methacrylate-styrene monomer, polystyrene, and polyformaldehyde.

11. A backlight module comprising:
    a back plate having a cavity;
    a plurality of lamps disposed above the back plate;
    a lamp fixing base disposed on the back plate for fixing the lamps, the lamp fixing base having a supporting portion above the cavity, an orthogonal projection of the supporting portion on the back plate being within a boundary of the cavity; and
    a diffusion plate disposed over the back plate, the supporting portion being suitable for supporting the diffusion plate.

12. The backlight module as claimed in claim 11, wherein the lamp fixing base further comprising two supporting arms and a plurality of lamp holders respectively located on the two supporting arms, the two supporting arms extend from two opposite sides of the supporting portion, and the lamp holders are respectively fixed onto the back plate.

13. The backlight module as claimed in claim 12, wherein a width of each of the two supporting arms is smaller than a width of the cavity.

14. The backlight module as claimed in claim 11, further comprising a reflective film disposed on the back plate, the reflective film having a plurality of slits or an opening corresponding to the cavity.

15. A backlight module comprising:
    a back plate having a cavity;
    a plurality of lamps disposed above the back plate;
    a lamp fixing base disposed on the back plate for fixing the lamps, the lamp fixing base having a supporting portion hung above the cavity and two supporting arms extend from two opposite sides of the supporting portion, an orthogonal projection of the supporting portion on the back plate being within a boundary of the cavity; and
    a diffusion plate disposed over the back plate, the supporting portion being suitable for supporting the diffusion plate;
    wherein the supporting portion comprises a first base and a supporting pillar located on the first base, and the first base is connected to the two supporting arms.

16. The backlight module as claimed in claim 15, wherein a width of the first base and a width of a bottom of the supporting pillar are both smaller than a width of the cavity.

17. The backlight module as claimed in claim 15, wherein a total length of the first base and the two supporting arms is greater than a length of the cavity.

18. The backlight module as claimed in claim 15, wherein a length of a bottom of the supporting pillar is smaller than a length of the cavity.

* * * * *